Sept. 11, 1956 W. SCHMID 2,762,992
SIGNALING SYSTEM FOR CONTROLLING AT A REMOTE STATION
MOVEMENT SEQUENCES OF LAND, WATER AND AIR VEHICLES
Filed Nov. 22, 1952 7 Sheets-Sheet 1

Wolfgang Schmid
INVENTOR

BY
ATTORNEY

Sept. 11, 1956 W. SCHMID 2,762,992
SIGNALING SYSTEM FOR CONTROLLING AT A REMOTE STATION
MOVEMENT SEQUENCES OF LAND, WATER AND AIR VEHICLES
Filed Nov. 22, 1952 7 Sheets-Sheet 2

Wolfgang Schmid
INVENTOR
BY
ATTORNEY

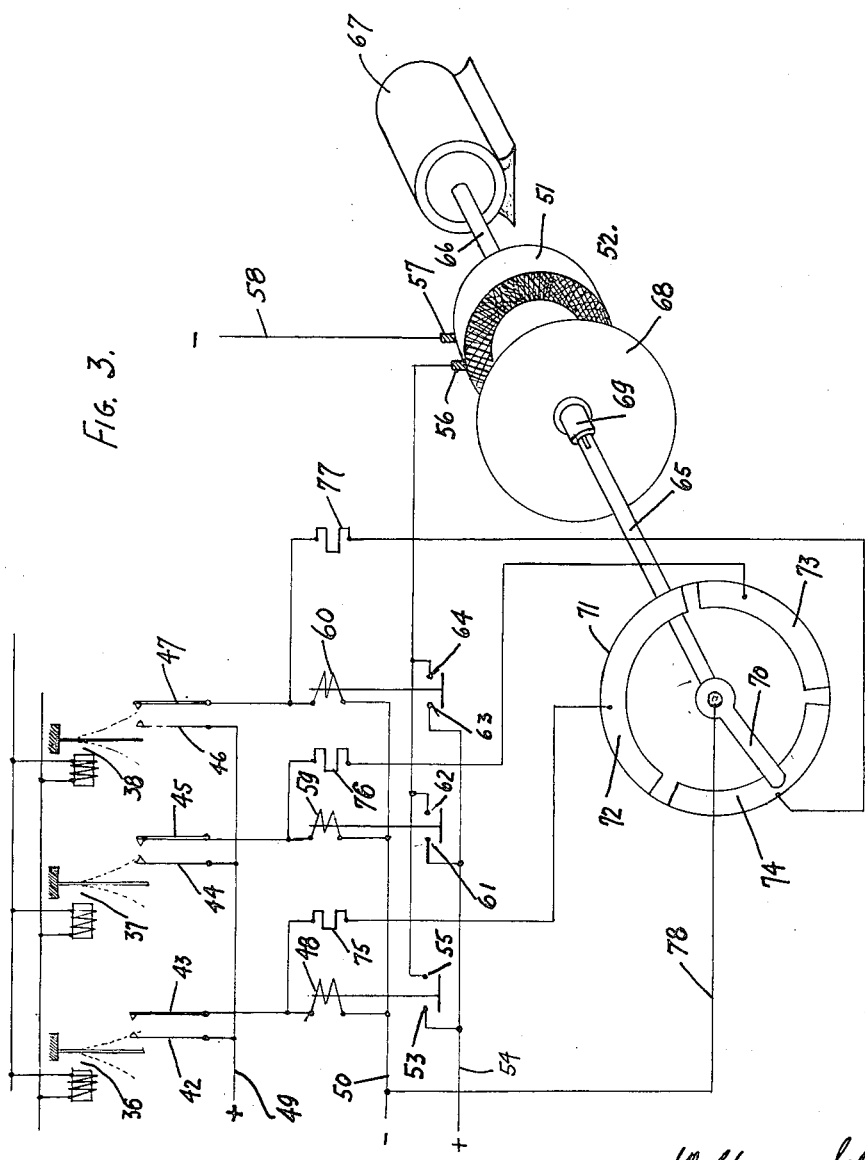

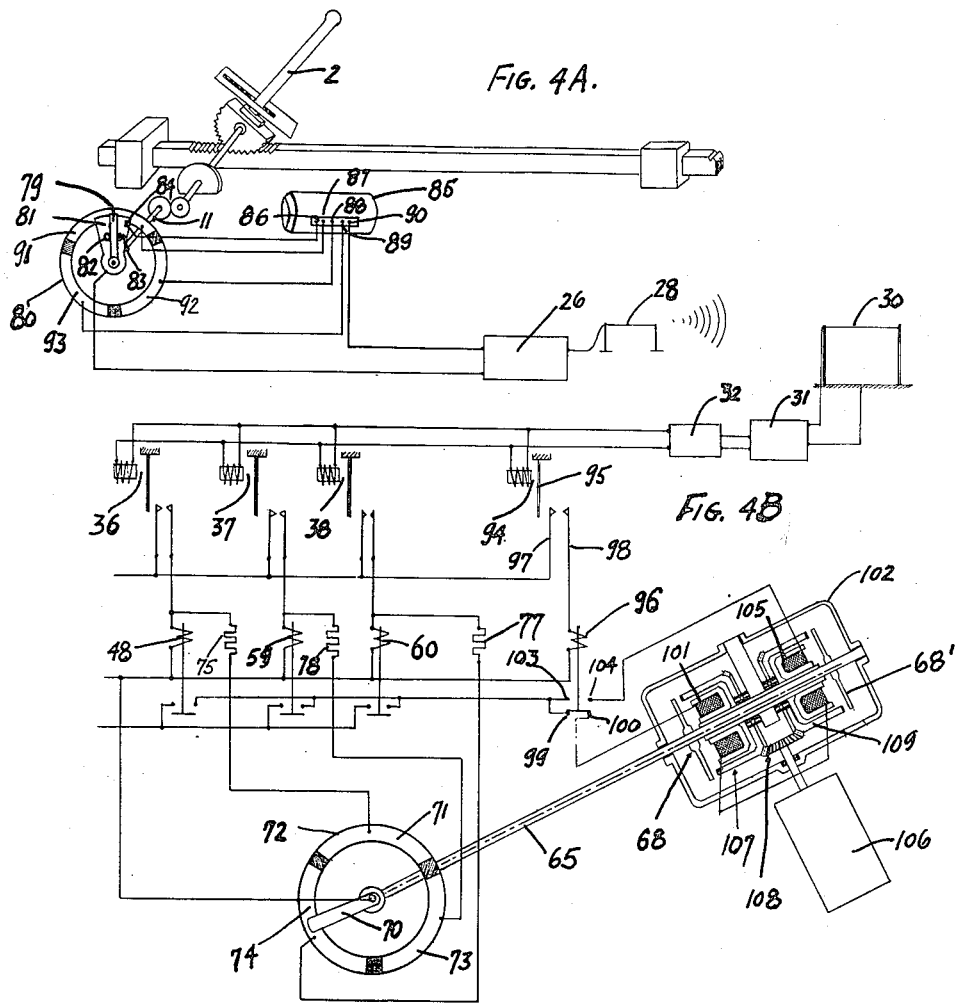

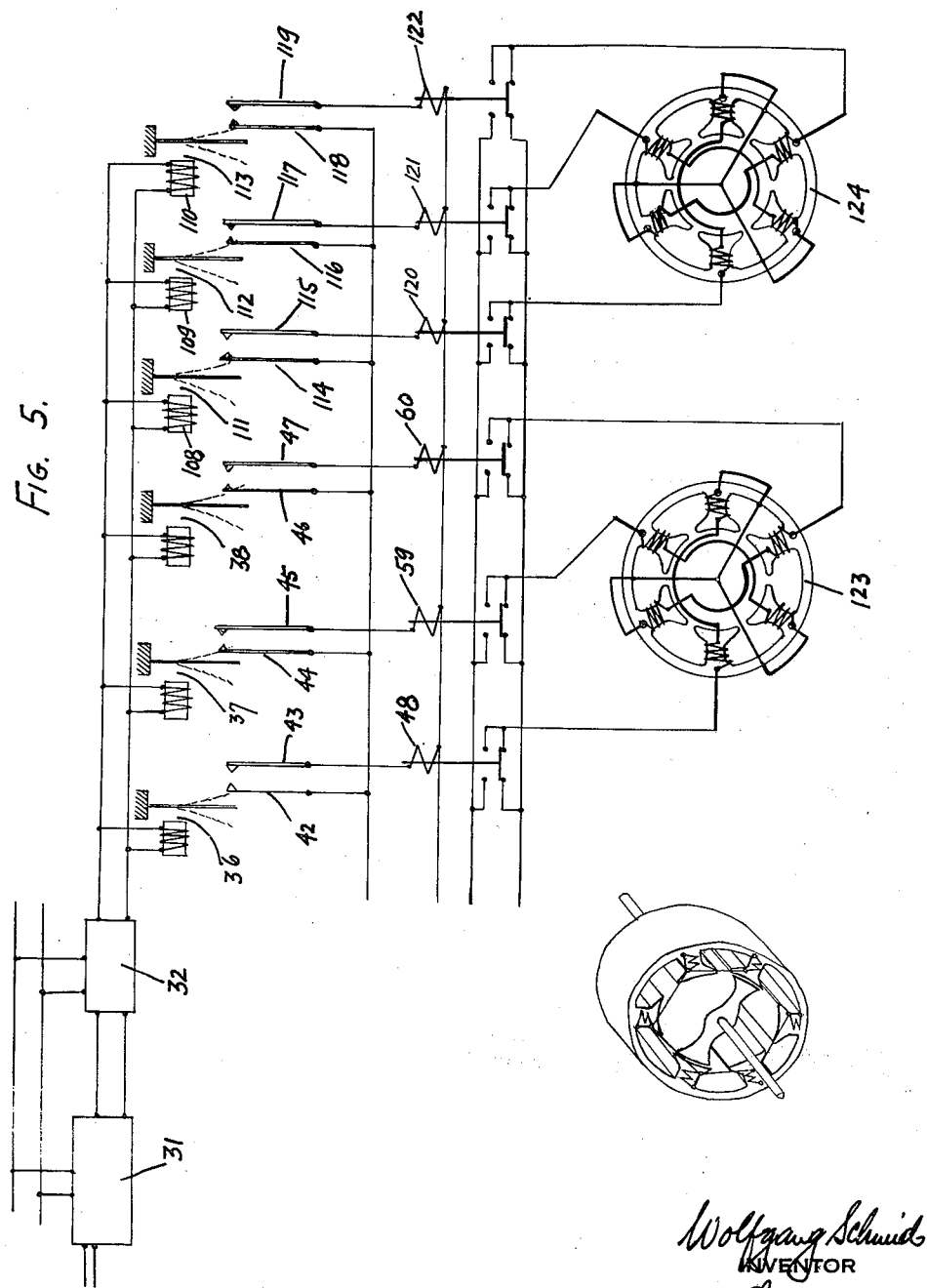

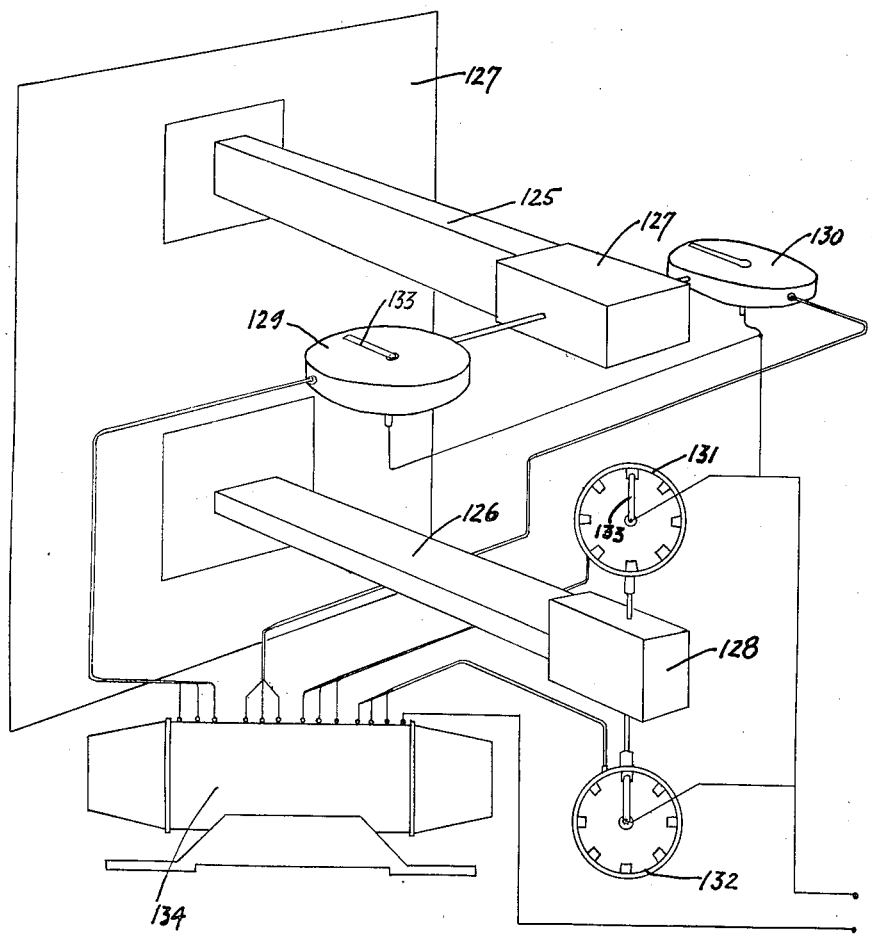

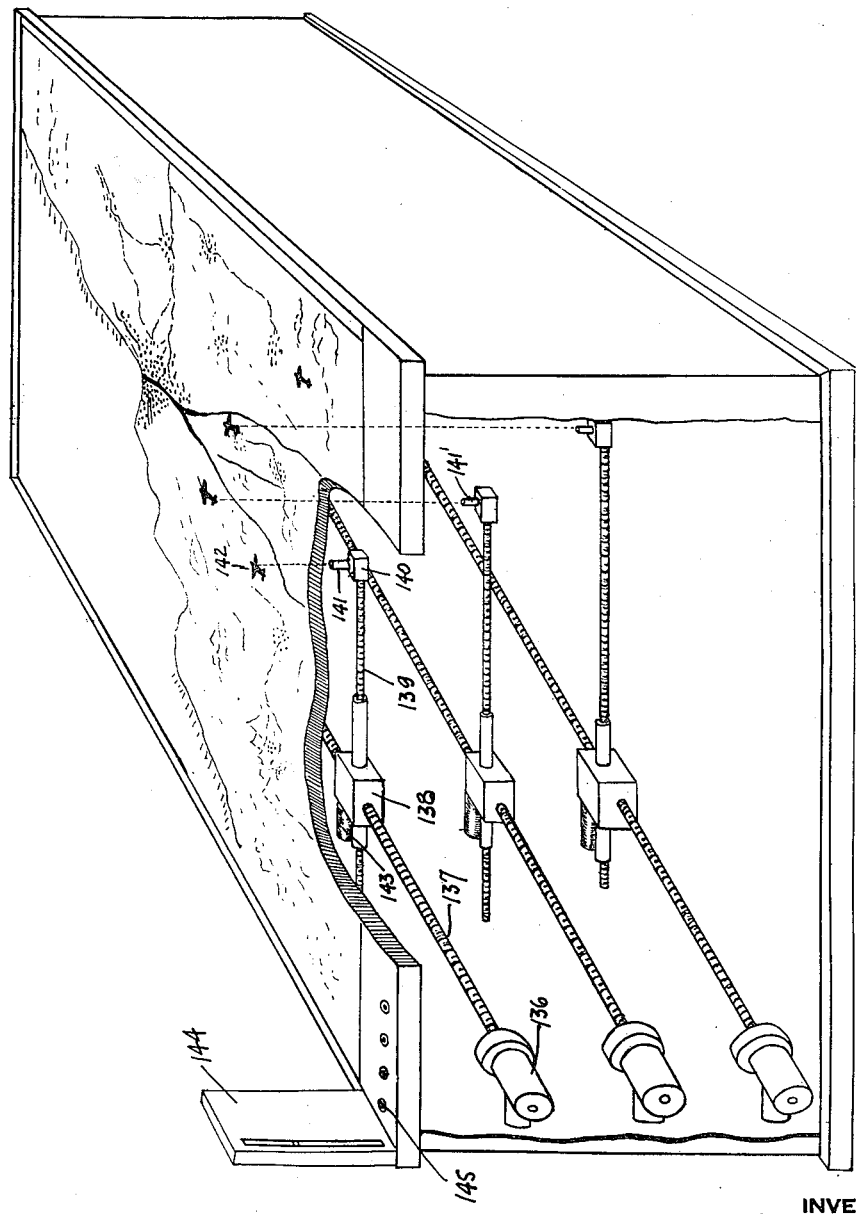

United States Patent Office 2,762,992
Patented Sept. 11, 1956

2,762,992

SIGNALING SYSTEM FOR CONTROLLING AT A REMOTE STATION MOVEMENT SEQUENCES OF LAND, WATER, AND AIR VEHICLES

Wolfgang Schmid, Riederau am Ammersee, Germany

Application November 22, 1952, Serial No. 322,086

Claims priority, application Germany November 24, 1951

3 Claims. (Cl. 340—24)

This invention relates to automatic signalling systems for controlling at a central station the sequences of directional movements of vehicles remote from the central station.

Particularly with aircraft accidents presumably attributable to errors in the operation thereof do occur, of which accidents the causes cannot with certainty be thereafter determined. The instant invention permits of such ascertainment, and more generally, of the supervision of the course from the control central station by the use of radio transmitting equipment automatically actuated by the motion controlling apparatus of the vehicle, the signals transmitted operating selectively operable equipment at the control station for visually indicating on a reduced scale the exact details of the travel of the craft. The central station may also be provided with recording equipment to make a permanent record of such travel thereby enabling repeated reproduction thereof for more accurate observation and study.

It is an object of the invention to provide in the craft means which are controlled by operating the craft's propelling controls to transmit automatically the succession of operations of the propelling controls, and to provide at a central station remote from the craft means for reproducing on a reduced scale such operations as they occur with or without simultaneously recording the sequence for later and repeated reproduction.

The instant invention will be more readily understood from the following description of illustrative embodiments thereof installed in an airplane and a ground control station taken in conjunction with the drawings in which:

Figure 3 is a circuit schematic of the interconnection of the frequency selective apparatus with the step-by-step driving means for a magnetic coupler by which the reduced scale observation apparatus is actuated;

Figure 4 is a schematic showing a second alternative of the craft installation of my invention as well as of the central control station equipment for actuating a reversible magnetic coupler by which the observation apparatus is operable;

Figure 5 is a schematic showing a third illustrative embodiment of the central station equipment in which a pair of step-by-step motors are employed for actuating the observation apparatus;

Figure 6 is a highly simplified schematic of another illustrative embodiment of the aircraft installation for automatically transmitting directional movements and changes therein; and Figure 7 is a simplified view of the terrian table actuable by the step-by-step drive equipment at the central station on which the movements of the craft are reproduced for observation.

Figure 1:
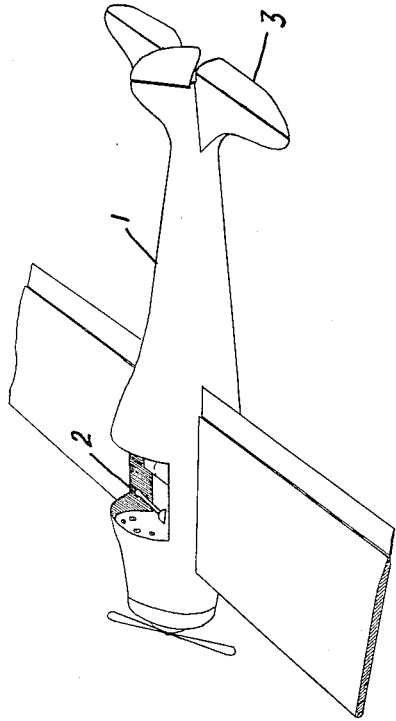
Figure 1 is a schematic diagram of my instant invention in one illustrative embodiment showing the relation of the automatic transmitting equipment under control of the elevational control of the plane.
Figure 1:
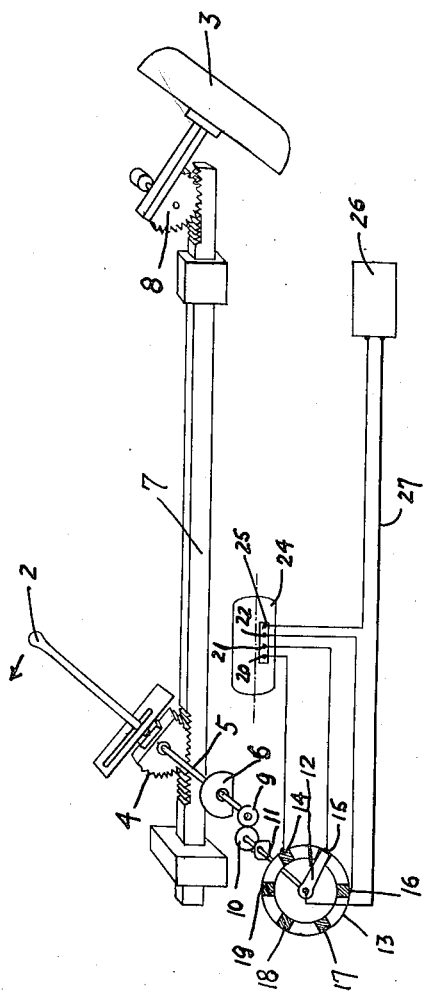

Referring to the figures, the aircraft 1 has a control stick 2 by which the elevational control rudder 3 is operable in known manner. Control stick 2 has a gear segment 4 attached at its lower end in such manner that when the stick 2 is moved linearly toward or away from the pilot, gear segment 4 is rotated with its integral shaft 5 which shaft is supported in bearing 6. The gear segment 4 meshes with the rack 7 slidably supported in the body of the aeroplane and extending rearwardly to the region of elevational control rudder 3. The rudder end of the toothed rack 7 engages a gear segment 8 integral with the control rudder and is rotatably supported in the aircraft body in such manner that the rudder can be elevated or depressed on rotation of gear segment 8. At an end region of shaft 5 an integral gear 9 meshes with gear 10 on rotatable shaft 11. The shaft carries a sliding contact arm 12 of a ring 13 of insulating material having spaced conductive contacts 14, 15, 16, 17, 18 and 19, which contacts are electrically connected respectively to terminals 20, 21 and 22 of a three-frequency generator 24, with contacts 14 and 17, 15 and 18, and 16 and 19 being interconnected. The three frequencies of the generator are connected and applied to the transmitter 26 by way of generator terminal 25 when the sliding contact 12 makes contact with a particular one of the fixed contacts, 14 . . . 19, the circuit being completed by the conductor 27 to the shaft end of sliding contact arm 12. On movement of control stick 2, the individual frequencies are thus impressed successively on transmitter 26 in accordance with such motion, the transmitter being operatively associated with aircraft antenna 28.

Control station 29, which may be the starting airfield, has antenna 30 to receive the transmitted frequencies and is connected to receiving equipment 31. Amplifier 32 amplifies the received signals and applies the amplified currents to coils 33, 34 and 35, of the tuned relays 36, 37 and 38 respectively, connected in parallel to the amplifier output. Each of the frequency tuned relays has a metal reed, 39, 40 and 41 respectively which is tuned to a different one of the three transmitted frequencies. When the amplified received frequency applied to the coils connected in parallel corresponds, for example, to the frequency to which reed 39 of relay 36 is tuned, reed 39 vibrates with an amplitude sufficient to deflect the spring supported contact 42 so that the latter engages fixed contact 43. Similarly if such frequency corresponds to that to which either reed 40 or 41 is tuned, such reed will vibrate at sufficient amplitude to cause its associated spring contact, 44 or 46, to engage the associated fixed contact, 45 or 47. Thus the frequency tuned relays 36, 37 and 38 close their associated contact pairs, 42 and 43, 44 and 45, and 46 and 47, in exact synchronism with the frequencies transmitted from three-frequency generator 24, and either slowly or rapidly in accordance with the movements of control stick 2.

As shown in Figure 3, when relay 36 responds, contacts 42 and 43 engage, and potential is applied to the coil of auxiliary relay 48, the current flowing from the + line 49 through closed contacts 42 and 43, the coil of the relay, and back to the − line 50 of the direct current potential source. Relay 48 is energized and connects to coil 51 of magnetic coupler 52 by engaging its armature to contact 53, connected to the + side 54 of a direct current potential source, and to contact 55 connected to terminal 56 of coil 51. Terminal 57 of coil 51 is connected to the − side 58 of the source of D. C. potential. Similarly on frequency tuned relay 37 or 38 responding, its contact pair, 44 and 45 or 46 and 47, engage, potential from the D. C. source is applied to the coil of auxiliary relay 59 or 60 energizing the coil and by way of contacts, 61 and 62 or 63 and 64, energizing coil 51; relays 59 and 60 being in parallel to relay 48, contacts 61 and 63 being in parallel to contact 53, and contacts 62 and 64 being in parallel to contact 55.

When the tuned frequency relays are energized rapidly in succession, shaft 65 is continuously coupled to shaft 66, the latter being driven by motor 67. As soon as coil 51 of the magnetic coupler is energized through brush terminals 56 and 57, plate 68 which is slidably supported on shaft 65 by a key 69, is attracted and as soon as it rotates with coil 51, rotates shaft 65. If the successive energizations of the frequency tuned relays are in rapid sequence, shaft 65 will rotate at high speed, but if such relays are energized at appreciable intervals the coupling is repeatedly severed so that shaft 65 is rotated in but definite steps. Due to the inertia of the masses involved, angular displacements may occur between shaft 65 and the sliding contact arm of the impulser after a large number of connecting impulses. To eliminate such angular displacement, auxiliary apparatus is provided in the form of a rotatable contact arm 70 having one end affixed to shaft 65 with its other end sliding over segmented contact ring 71, having three spaced circumferential segments 72, 73 and 74. Segment 72 conductively connected to short circuiting resistance 75 connected to the terminal of the coil of auxiliary relay 48, and similarly segment 73 is so connected through short circuiting resistance 76 to the end of the coil of auxiliay relay 59 and segment 74 through short circuiting resistance 77 to the terminal of the coil of auxiliary relay 60. In Figure 3, rotatable contact arm 70 is shown in engagement with segment 74, its shaft end being connected by lead 78 to the — side 50 of the D. C. source. If now tuned relay 36 is energized, auxiliary relay 48 is energized as is coil 51 of the magnetic coupler by way of contacts 53 and 55. Plate 68 is thus attracted and shaft 65 together with rotatable contact arm 70 therein is rotated. But the contact arm 70 can be rotated only through a quite definite predetermined angle for as soon as arm 70 engages the succeeding element 72, the coil of relay 48 is shorted by resistance 75. Relay 48 thus releases, coil 51 of the magnetic coupler is deenergized, and the magnetic coupler opens. If now the second tuned relay 37 is energized, contacts 61 and 62 are interconnected and potential again applied to coil 51, the magnetic coupler now closes and sliding contact arm 70 against rotates until it engages segment 73, whereupon the coil of relay 59 is shorted by resistance 76, relay 59 deenergizes and the coupling is severed. Rotatable contact arm 70 then rotates again only when the third tuned relay 38 is actuated. By this auxiliary apparatus then, the magnetic coupler is caused to rotate only precise steps in synchronism with the impulse transmitter on the aircraft. To simplify the explanation but three contact segments are shown in Figure 3 but in actual practice, and is obvious, a greater number of segments may be provided, although the number of such segments must be in accord with the number of segments on the impulse transmitter.

Figure 2:
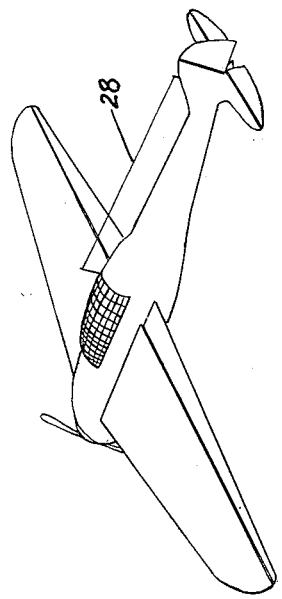
Figure 2 is essentially a circuit schematic of one illustrative embodiment of the central station showing the frequency selective apparatus thereof.
Figure 2:
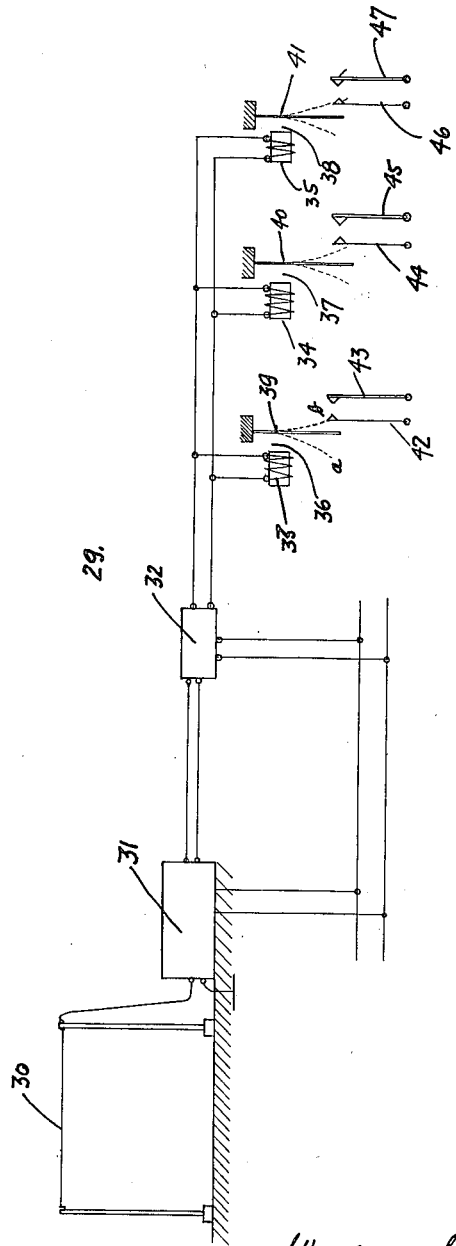

The control of a reversible magnetic coupling by the same principle and using a fourth tuned relay is shown in Figures 4A and 4B, the former showing the transmitting station on the craft and the latter the ground control station. Similar reference characters in these figures correspond to the same elements as used in the embodiments of Figures 1 to 3. The arm 79, affixed to the end of shaft 11, is adapted to rotate over the face of the impulse transmitting ring 80 on operation of control stick 2. When arm 79 is rotated in the counterclockwise direction as viewed in Figure 4A, corresponding to drawing stick 2 toward the pilot, arm 79 immediately carries along with it the sliding contact 81 in that the stop 82 thereon engages the arm 79. When rotated in the opposite, or clockwise, direction, the spring 83 between arm 79 and contact arm 81 must first be compressed until arm 79 engages stop 84 pin 84 on the contact arm, whereupon the contact arm 81 moves with arm 79. Frequency generator 85, capable of producing four different frequencies, has five terminals, 86, 87, 88, 89 and 90, of which terminal 86 is electrically connected to stop 84, terminal 87 to the conductive segment 91 of transmitter ring 80, terminal 88 to conductive ring segment 92, terminal 89 to conductive ring segment 93, while terminal 90 is connected to transmitter 26 to which the shaft end of sliding contact arm 81 is also connected, the transmitter in turn being connected to craft antenna 28. The spaced conductive segments of the transmitter are spaced from each other by interposed insulating segments. If now control stick 2 is pulled toward the pilot, the arm 79 is rotated in counter-clockwise direction and sliding contact arm 81 rotates with it due to stop 82 as above mentioned, and thus the frequencies corresponding to conductive segments 93, 92, and 91 are successively actuated in frequency generator 85. But when control stick 2 is pushed away from the pilot, arm 79 is rotated clockwise and the initial step is that stop 84 is engaged and an additional control frequency is passed by way of terminal 86 of the frequency generator. Immediately thereafter, arm 79 takes sliding contact arm 81 along in its clockwise rotation, as the result of which the other frequencies are transmitted successively as above but in reversed sequence. Only on clockwise rotation thus is a fourth control frequency involved for on counter-clockwise rotation the fourth control frequency remains unactuated.

At the ground receiving station of Figure 4B, a fourth tuned relay 94 is provided in addition to tuned relays 36, 37 and 38, the reed 95 thereof being tuned to respond only when arm 79 of the impulse transmitter engages stop 84 thus actuating the fourth control frequency, that is, only when control stick 2 is pushed in the direction away from the pilot. Reversing relay 96 is controlled by tuned relay 94 by way of the pair of contacts 97 and 98 of the same type as, for example, the contact pair 42, 43 of relay 36. With the reversing relay 96 not actuated, contacts 99 and 100 are bridged, and coil 101 of the magnetic reversible coupler 102 is controlled by auxiliary relays 48, 59 and 60. However, if reversing relay 96 is energized, contacts 103 and 104 are bridged and coil 105 of the coupler 102 is controlled by the stated auxiliary relays. In other aspects the instant embodiment operates as does the embodiment of Figure 3. Motor 106 drives the reversible coupler 102 of which the coils 101 and 105 are spatially immovable, shaft 65 being driven by integral bevel gears 107 and 109 about the respective coils, gears 107 and 109 being driven by bevel gear 108 integral on the shaft of motor 106. As will be noted, bevel gears 107 and 109 are driven in opposite directions by drive gear 108 and are loosely supported on shaft 65 which is driven in one direction or the other depending on whether plate 68 is attracted by its coil 101, or whether similarly supported plate 68' is attracted by its coil 105. As in the embodiment of Figure 3, the end region of shaft 65 carries the sliding contact arm 70 adapted to slide on segmented contact ring 71 of which each conductive segment 72, 73 and 74 is similarly connected to trigger the multiple frequency generator and to be shorted upon a predetermined rotation of the contact arm 70.

Figure 5 shows a further illustrative embodiment of the ground receiving station in which two stepping motors are used. The frequencies received by the receiving equipment 31 are amplified by amplifier 32 and applied to coils 33, 34, 35, 108, 109 and 110 of the tuned relays, which on their own energization and by way of their respective contact pairs in turn permit energization of the auxiliary relays 48, 59, 60, 120, 121 and 122 as above described for the central station of Figure 3. By the actuation of relays 48, 59 and 60 the pole windings of the stepping motor 123 are successively energized in a certain operational rhythm, while the pole windings of stepping motor 124 are so energized by relays 120, 121 and 122, advancing the rotor of a respective motor a predetermined amount. When the relays are operated in the reverse sequence the rotor is advanced in the opposite direction. Absolute synchronism is assured in that with the reception of a definite frequency, the drive is only for a very definite step.

The control devices described above are for the purpose of transmitting the pilot's operations in controlling his craft to the central control station. Just as the elevational operations are transmitted so also the movements of the lateral rudders may be automatically transmitted to the central station. Similarly all movements executed by the operator of any power craft, land, water or air, may in this manner be automatically transmitted to a central control station.

Figure 6 shows how by means of the readings being impressed on indicating or recording measuring devices automatically, the values thereof may be automatically transmitted by the instant invention to the remote central station. The figure shows the installation in an aircraft, in which two strong steel springs 125 and 126 are supported on and project from a vertical wall in such manner that the unsupported end of spring 125 may move horizontally and that of spring 126 vertically. Massive weight 127 is integral with the unsupported end of spring 125 and a similar weight 128 is so disposed on spring 126. Assume the aircraft is travelling horizontally in the direction to the right of the figure. If it now flies to a lower altitude, spring 126, due to the inertia of weight 128, deflects upwardly, while if the plane climbs to a higher altitude, this spring bends downwardly. Similarly spring 125 is deflected when the speed of the aircraft changes. The structure is thus responsive to all changes in acceleration. To do so, indicating devices 129, 130, 131 and 132 are operatively disposed in pairs to opposite sides of weights 127 and 128 so as to respond to their movement. Each indicating device has a sliding contact 133 by which the different frequencies of the multifrequency generator 134 may be connected or disconnected. When weight 128 moves upwardly, the sliding contact 133 of indicating device 131 rotates clockwise and slides over a plurality of fixed contacts circumferentially spaced, to each of which fixed contacts a particular frequency of generator 134 is connected, and thus will cause transmission of the frequencies successively as above described. The measured acceleration values must be twice integrated to determine the route actually flown, and such integrations may be performed electrically, and at the receiving station if that, as a practical matter, is preferred to doing so on the aircraft. The illustrated measuring device for acceleration changes may be supplemented by a third steel spring so that all motion in the three dimensions may be included.

In Figure 7 is shown an automatic map table on which aircraft may be shown as a light spot which automatically moves on a reduced scale in synchronism with the actual aircraft. On the table top 135, which is of transparent glass for example, the landscape is drawn to scale. The magnetic reversible coupling 136 rotates the spindle 137 clockwise or counterclockwise, thus moving the block 138, threaded on spindle 137, forward or backward. Threaded spindle 139, carried by block 138, is rotated by reversible magnetic coupling 143 carried by the block so that it is moved further out of or into the block transversely the block motion caused by spindle 137. A block 140 on the end of spindle 139 carries a small beam light 141 of which the beam is so directed as to produce the light spot 142 on the map, thus marking the position of the aircraft. By the use of a plurality of the elements described in the preceding three sentences the position of additional aircraft flying the terrain included in the table map may be indicated thereon. The coupling 136 is obviously any of the magnetic couplers or the two stepped driving motors hereinabove described.

To enable immediate ascertainment of the altitude of the aircraft, the scale 144 in which is contained a reed frequency measuring device, is provided. To actuate the latter, the altimeter in the aircraft is coupled to the rotatable knob of a beat generator of which the frequency is radio transmitted. If now the pushbutton 145 is depressed the scale 144 will indicate the altitude at which the aircraft is flying, for the higher the craft is flying the higher is the radiated frequency which actuates the read frequency measuring device. Similarly the altitude of a plurality of aircraft may be read directly from the one scale equipped with a plurality of channels releasable by a pushbutton as desired.

It is to be understood that the above are but illustrative embodiments of the control system of my invention, which system may be applied in various ways. For example, electric filters can be used in place of the above described frequency tuned relays. Also by actuation of the control stick a continuous change in frequency may be effected, for example, by coupling a control member to the control stick, the member varying the frequency of a tube generator. If a differential drive is provided at the receiver, driven by a motor of constant speed, the driving shaft of the differential drive may rotate clockwise when the control motor rotates at speeds higher than that of the constant speed motor and counterclockwise when the control motor, as the result of the lower frequency received, runs at speeds less than that of the constant speed motor. All of these variations are within the spirit of the instant invention. Obviously the frequencies transmitted from the aeroplane or other craft may be recorded, magnetically on tape, electrically on discs, or electro-photographically on film, and thus the entire sequence of movements of the craft be observed as often as may be required by reproduction on the map table, which is then controlled by the recording.

What I claim is:

1. Signaling system for telemetering at a remote station the path of travel of a vehicle comprising mechanical means in the vehicle for guiding the path of travel thereof, a multifrequency electrical generator in said vehicle, electrical means in said vehicle connected to the mechanical guiding means, a radio transmitter in said vehicle for modulating the frequencies of the generator and transmitting the modulated frequencies, the electrical means actuating the generator at successive frequencies in accord with the actuated position of the mechanical guiding means, a radio receiver at a remote station, including a plurality of frequency responsive means being stepwise actuated by a different frequency of the generator as transmitted by the transmitter, a constantly rotating drive shaft, a driven shaft, a magnetizable coupling element including a coil on the drive shaft, a coupling member of magnetic material keyed to the driven shaft and in cooperative relation with the magnetizable coupling element, the coil of the magnetizable coupling element being intermittently energized in response to the actuation of each responsive means of the plurality to rotate the driven shaft a predetermined amount, a scale map of the terrain travelled by the vehicle, and a visual indicator of the vehicle carried by the driven shaft, the visual indicator being moved by the driven shaft relative to the scale map in accordance with the rotation of the driven shaft.

2. Signaling system according to claim 1 in which the vehicle is an aircraft, the mechanical guiding means is the air craft control stick, and the electrical means connected to the mechanical guiding means comprises a gear sector integral with the control stick, a driven shaft, gearing engaging the sector to drive the shaft, an electrical distributor having a plurality of spaced fixed conductive contacts, and a movable contact rigid on the shaft and adapted to engage the fixed contacts in succession on movement of the control stick in either of two mutually opposite directions.

3. Signalling system according to claim 1 in which the vehicle is an aircraft, the mechanical guiding means is the control stick thereof, the electrical means connected to the mechanical guiding means comprises a gear sector integral with the control stick, a driven shaft, gearing coupling the sector to the shaft, a distributor having a plurality of spaced conductive contacts and a movable contact rigid on the shaft and adapted to engage the fixed contacts in succession on movement of the control stick in either of two mutually opposite directions, and the frequency responsive means is a tuned relay having a coil, a tuned vibratile reed, a spring mounted contact, a fixed contact spaced from the spring mounted contact, the reed being adapted to vibrate on energization of the coil at such amplitude as to close the spring mounted contact on the fixed contact.

References Cited in the file of this patent

UNITED STATES PATENTS

| | | |
|---|---|---|
| 1,822,868 | Grimes | Sept. 8, 1931 |
| 2,231,156 | Glaytor | Feb. 11, 1941 |
| 2,393,892 | De Ganahl | Jan. 29, 1946 |
| 2,397,088 | Clay | Mar. 26, 1946 |
| 2,397,604 | Hartley et al. | Apr. 2, 1946 |
| 2,398,419 | Finison | Apr. 16, 1946 |
| 2,404,942 | Bedford | July 30, 1946 |
| 2,413,300 | Dunn et al. | Dec. 31, 1946 |
| 2,428,017 | Devaux | Sept. 30, 1947 |
| 2,476,301 | Jenks | July 19, 1949 |
| 2,490,844 | Sorensen | Dec. 13, 1949 |
| 2,526,693 | Rust | Oct. 24, 1950 |
| 2,569,328 | Omberg | Sept. 25, 1951 |